US012530731B2

(12) United States Patent
Torshizi et al.

(10) Patent No.: US 12,530,731 B2
(45) Date of Patent: Jan. 20, 2026

(54) CLOUD-BASED ARTIFICIAL INTELLIGENCE ROUTING FOR EMERGENCY EVACUATION SYSTEMS USING WI-FI ACCESS POINTS OVER DATA COMMUNICATION SYSTEMS

(71) Applicant: Fortinet, Inc., Sunnyvale, CA (US)

(72) Inventors: Seyed Dawood Sajjadi Torshizi, Burnaby (CA); Yanjie Gu, Surrey (CA)

(73) Assignee: Fortinet, Inc., Sunnyvale, CA (US)

( * ) Notice: Subject to any disclaimer, the term of this patent is extended or adjusted under 35 U.S.C. 154(b) by 1166 days.

(21) Appl. No.: 16/370,182

(22) Filed: Mar. 29, 2019

(65) Prior Publication Data

US 2020/0311852 A1 Oct. 1, 2020

(51) Int. Cl.
*H04L 67/10* (2022.01)
*G06N 5/04* (2023.01)
(Continued)

(52) U.S. Cl.
CPC ............ *G06Q 90/205* (2013.01); *G06N 5/04* (2013.01); *H04L 67/10* (2013.01); *H04W 4/023* (2013.01);
(Continued)

(58) Field of Classification Search
None
See application file for complete search history.

(56) References Cited

U.S. PATENT DOCUMENTS 7,349,768 B2 * 3/2008 Bruce .............. G08G 1/096844
701/1
8,818,713 B2 * 8/2014 Kumar ................... G01C 21/20
701/423
(Continued)

FOREIGN PATENT DOCUMENTS

KR 20120027969 A * 9/2010
KR 20150073574 A * 7/2015
(Continued)

OTHER PUBLICATIONS

F. M. Naini, O. Dousse, P. Thiran and M. Vetterli, "Opportunistic Sampling for Joint Population Size and Density Estimation," in IEEE Transactions on Mobile Computing, vol. 14, No. 12, pp. 2530-2543, Dec. 1, 2015, doi: 10.1109/TMC.2015.2393302. (Year: 2015).*

(Continued)

*Primary Examiner* — Yves Dalencourt
(74) *Attorney, Agent, or Firm* — Law Office of Dorian Cartwright; Dorian Cartwright (57) ABSTRACT

A cloud-based intelligence to emergency evacuation systems using Wi-Fi access points over data communication systems. A layout of emergency exits for a building being monitored and AP locations within the building layout is configured. A density map is generated from a number of stations within radio range of each AP including stations that are connected and stations that are not connected. An emergency that requires evacuation of people from the building from an emergency system associated with the (Continued)

building is detected. In response, an optimal evacuation route from each AP based on the density map and the building layout is generated. Evacuation instructions for each AP can be displayed on the stations within range of each AP.

4 Claims, 6 Drawing Sheets

(51) Int. Cl.
| | |
|---|---|
| *G06Q 90/00* | (2006.01) |
| *H04W 4/02* | (2018.01) |
| *H04W 4/024* | (2018.01) |
| *H04W 4/33* | (2018.01) |
| *H04W 4/90* | (2018.01) |
| *G06N 20/00* | (2019.01) |
| *H04W 84/12* | (2009.01) |

(52) U.S. Cl.
CPC ............ *H04W 4/024* (2018.02); *H04W 4/33* (2018.02); *H04W 4/90* (2018.02); *G06N 20/00* (2019.01); *H04W 84/12* (2013.01)

(56) References Cited

U.S. PATENT DOCUMENTS

| | | | | |
|---|---|---|---|---|
| 8,972,357 | B2* | 3/2015 | Shim | G06F 16/245 |
| | | | | 455/456.3 |
| 9,467,662 | B2* | 10/2016 | Childers | H04N 7/181 |
| 2011/0105084 | A1* | 5/2011 | Chandrasekaran ... | H04W 12/08 |
| | | | | 455/411 |
| 2013/0024106 | A1* | 1/2013 | Kumar | G01C 21/20 |
| | | | | 701/423 |
| 2018/0242169 | A1* | 8/2018 | Kowal | H04W 24/02 |
| 2021/0035203 | A1* | 2/2021 | Daigle | G06Q 30/0645 |

FOREIGN PATENT DOCUMENTS

| | | | |
|---|---|---|---|
| KR | 20170106665 A | * 3/2016 | |
| KR | 2018-0005840 A | * 1/2018 | |
| WO | WO-2016194129 A1 | * 12/2016 | |
| WO | WO-2019159106 A1 | * 8/2019 | G06F 16/61 |

OTHER PUBLICATIONS

A. Filippoupolitis, G. Gorbil and E. Gelenbe, "Spatial Computers for Emergency Management," 2011 Fifth IEEE Conference on Self-Adaptive and Self-Organizing Systems Workshops, 2011, pp. 61-66, doi: 10.1109/SASOW.2011.13. (Year: 2011).*
KR-20120027969-A Translation (Year: 2010).*
Translation KR 20170106665 A (Year: 2018).*
Translation of WO-2016194129-A1 (Year: 2016).*
H. Bi, "Emergency navigation systems and algorithms in confined spaces," 2016 3rd International Conference on Information and Communication Technologies for Disaster Management (ICT-DM), 2016, pp. 1-8, doi: 10.1109/ICT-DM.2016.7857216. (Year: 2017).*
M. B. Yassein, S. Aljawarneh and S. Alodibat, "A mathematical model of integrated cloud computing and WSNs for emergency systems," 2017 International Conference on Engineering & MIS (ICEMIS), 2017, pp. 1-12, doi: 10.1109/ICEMIS.2017.8272973. (Year: 2017).*
O. J. Akinwande and H. Bi, "Routing diverse crowds in emergency with dynamic grouping," 2015 IEEE International Conference on Pervasive Computing and Communication Workshops (PerCom Workshops), 2015, pp. 487-492, doi: 10.1109/PERCOMW.2015. 7134086. (Year: 2015).*
J. Radianti, O.-C. Granmo, N. Bouhmala, P. Sarshar, A. Yazidi and J. Gonzalez, "Crowd Models for Emergency Evacuation: A Review Targeting Human-Centered Sensing," 2013 46th Hawaii International Conference on System Sciences, 2013, pp. 156-165, doi: 10.1109/HICSS.2013.155. (Year: 2013).*
S. S. Kulkarni and S. D. Agashe, "Study of Intelligent Evacuation Systems of High-Rise Buildings in India—a review," 2016 International Conference on Computing, Analytics and Security Trends (CAST), 2016, pp. 190-194, doi: 10.1109/CAST.2016.7914964. (Year: 2016).*

* cited by examiner

CLOUD-BASED ARTIFICIAL INTELLIGENCE ROUTING FOR EMERGENCY EVACUATION SYSTEMS USING WI-FI ACCESS POINTS OVER DATA COMMUNICATION SYSTEMS

FIELD OF THE INVENTION

The invention relates generally to computer networking improvements, and more specifically, to cloud-based artificial intelligence routing for emergency evacuation systems using Wi-Fi access points over data communication systems.

BACKGROUND

Emergency evacuations systems are typically hardwired into a control box stored locally on site. In response to a fire alarm or smoke detector signal, the emergency evacuation systems can activate all sirens and lights on the site to communicate the emergency situation to all persons on site. Often times, the sirens and lights are strategically placed around exits and staircases as an aid to persons trying to evacuate quickly. There may also be printed signs that show exit routes However, mass evacuations can also lead to mass panic. Each person determines an exit route, and may by habit, use the most popular doors and stairways, the closest visible doors and stairways, or follow the biggest crowd assuming this is the best way to evacuate.

Furthermore, there is typically no real-time feedback during evacuations. For example, as stairways and exits become obstructed by fire or smoke over the course of a fire, the best evacuation route can change.

Therefore, what is needed is a robust technique to cloud-based intelligence to emergency evacuation systems using Wi-Fi access points over data communication systems.

SUMMARY

These shortcomings are addressed by the present disclosure of methods, computer program products, and systems for cloud-based intelligence to emergency evacuation systems using Wi-Fi access points over data communication systems.

In one embodiment, a layout of emergency exits for a building being monitored and AP locations within the building layout is configured. A density map is generated from a number of stations within radio range of each AP including stations that are connected and stations that are not connected.

In one embodiment, an emergency that requires evacuation of people from the building from an emergency system associated with the building is detected. In response, an optimal evacuation route from each AP based on the density map and the building layout is generated. Evacuation instructions for each AP can be displayed on the stations within range of each AP.

Advantageously, best emergency routes are provided directly to each person in real-time.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems for cloud-based intelligence to emergency evacuation systems using Wi-Fi access points over data communication systems. One of ordinary skill in the art will recognize that many other scenarios are possible, given the present disclosure, as discussed in more detail below.

Systems for Cloud AI Emergency Evacuation (FIGS. 1-4)

Figure 1:
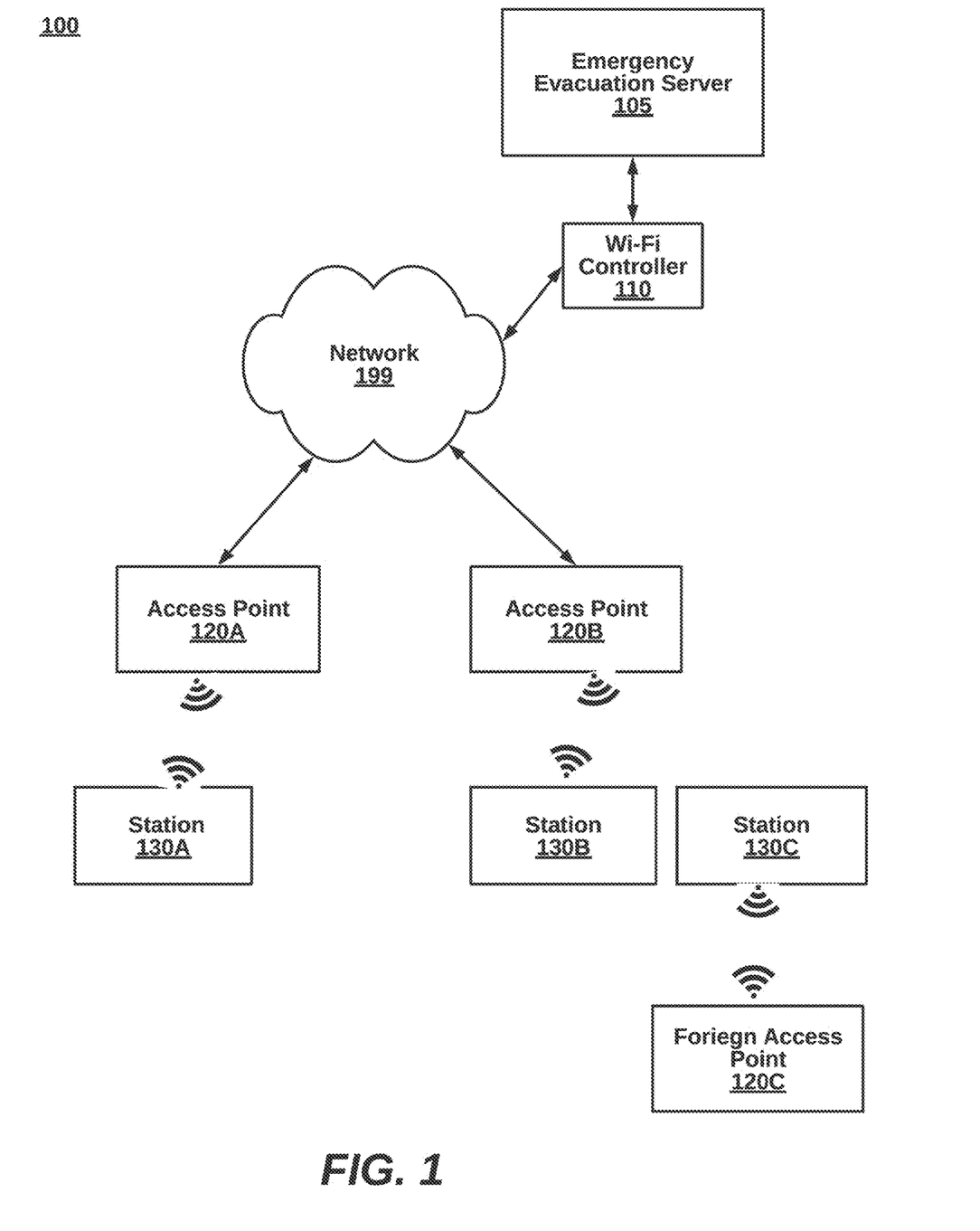
FIG. 1 is a high-level block diagram illustrating a system to centrally controlling locationing for cloud-based intelligence to emergency evacuation systems using Wi-Fi access points over data communication systems, according to one embodiment.

FIG. 1 is a high-level block diagram illustrating a system 100 to centrally controlling locationing for beamforming Wi-Fi transmissions to wireless stations from access points independent of beamforming capability of stations, according to one embodiment. The system 100 comprises a cloud-based emergency evacuation server 105, a cloud-based controller 110, access points 120A-B, stations 130A-D, and emergency system 140. Many other configurations are possible. For example, additional network components can also be part of the system 100, such as firewalls, virus scanners, routers, switches, application servers, databases, and the like.

Network 199 provides a data channel for components of the system 100 with network devices, such as routers, switches, network processors, and the like. The components can use data channel protocols, such as IEEE 802.11n, 802.11ac, or other versions of the 802.11 and other wireless standards. Referring specifically to FIG. 1, the emergency evacuation server 105, the cloud-based controller 110, the access points 120A-B are each connected to the network 199, preferably over wired connections. In, turn, the stations 130A-D are coupled to the access points 120A-B over wireless connections, such as Wi-Fi.

Figure 3A:
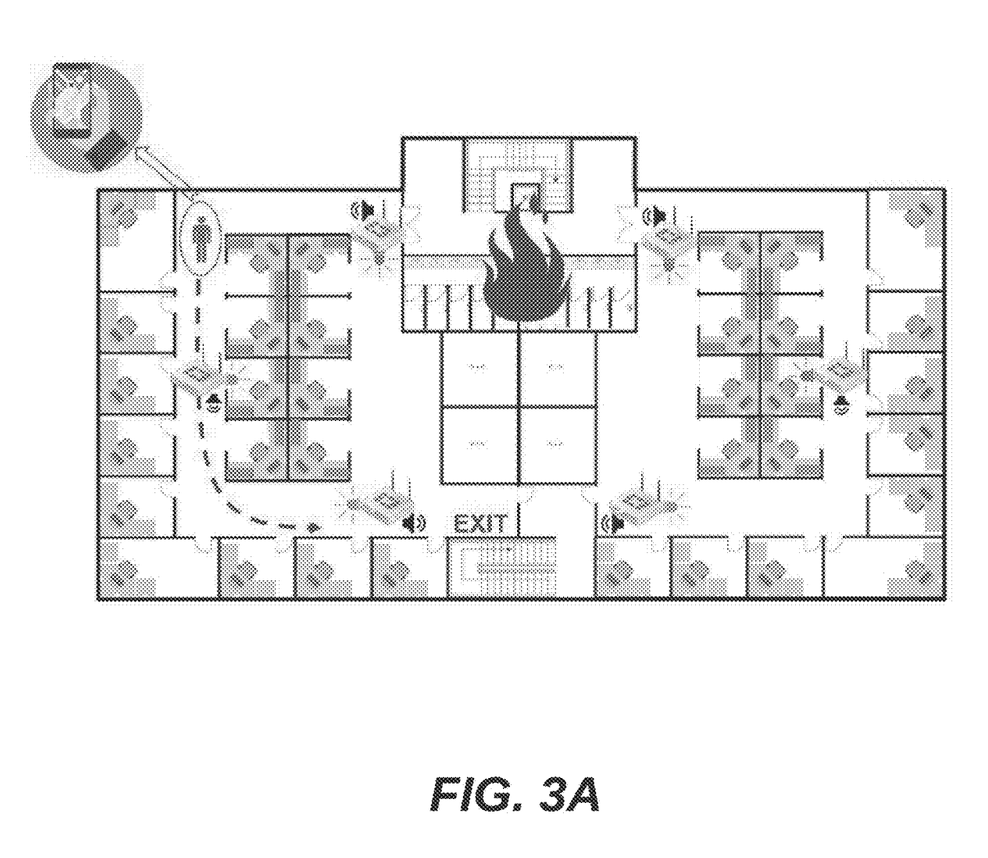
FIG. 3A is a schematic diagram illustrating an emergency route over a building layout, according to one embodiment.
Figure 3B:
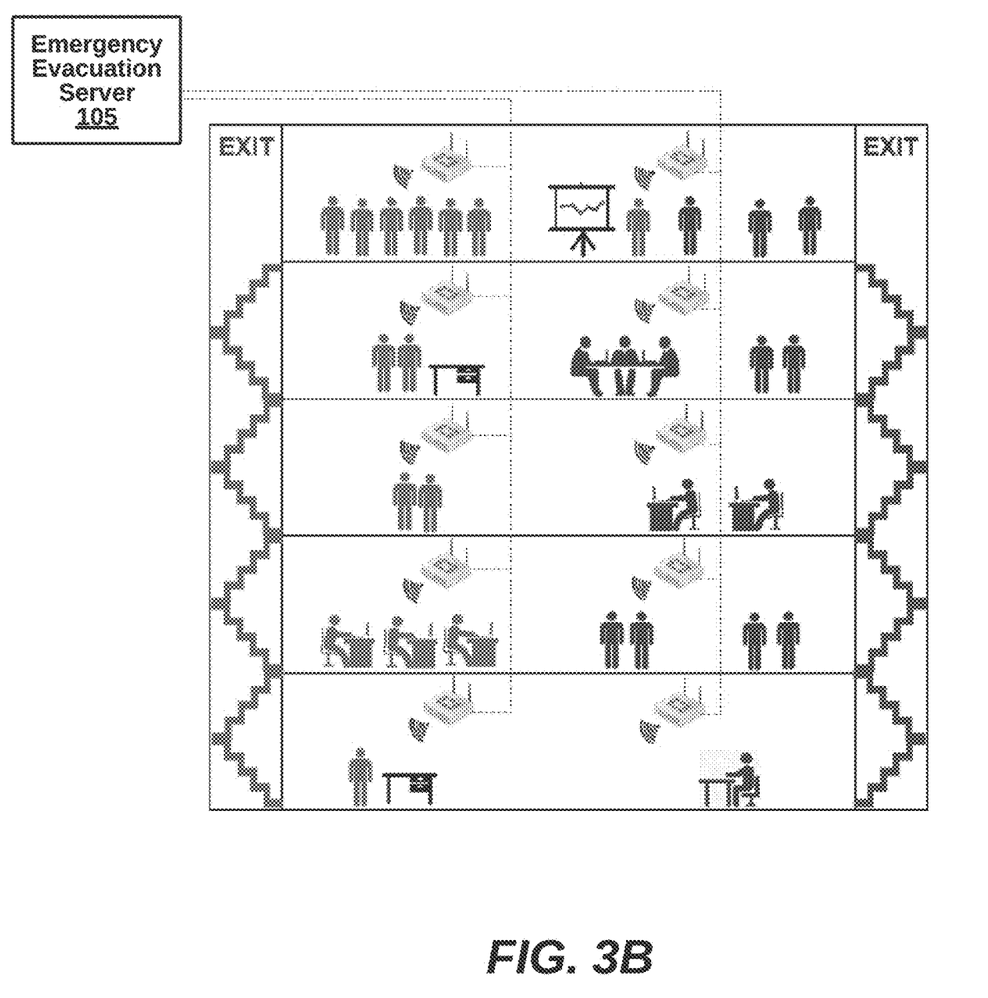
FIG. 3B is a schematic diagram illustrating density mapping over a building layout with staircases, according to one embodiment.

The emergency evacuation server 105, in an embodiment, monitors a status of the emergency system 140 and outputs emergency information to the stations 130A-D through the cloud-based controller 110. Monitoring can be through push notifications from the Wi-Fi controller 110. In more detail, the Wi-Fi controller 110 manages the access points 120A-B and also tracks stations within radio range, whether connected or not connected to the access points 120A-B. The emergency evacuation server 105 can then generate density maps for the number of stations, as shown in FIG. 3B. If an emergency signal is received, the density maps AI is relied upon to determine optimal routing for each access point, as shown in FIG. 3A. The AI is trained to estimate how many people correspond to a number of connections, an amount of data throughput, time of day, day of the week, and other factors. By taking into account stations within range that are not actually connected, additional accuracy is achieved.

In some embodiments, the emergency evacuation server 105 is a standalone device, and in other embodiments, is integrated with the controller 110. Furthermore, the emergency evacuation server 105 can be a third-part software-as-a-service offered to many different entities, or a be owned by a single entity serving one location or many locations in different cities.

The controller 110 manages the access points 120A-B with respect to Wi-Fi station connections, routing, and providing network-wide visibility. Each station connected, or just heard by the access points 120A-B is sent upstream to the controller 110 for tracking as the stations move from one access point to another access point, in order to maintain consistent network services (e.g., maintain QoS over different access points). Additionally, the controller 110 can quickly disperse messages from the emergency evacuation sever 105 for dissemination to stations in an emergency.

The controller 110 can be implemented in any of the computing devices discussed herein (e.g., see FIG. 6). For example, the cloud-based controller 110 can be an MC1500 or MC6000 device (e.g., modified) by Fortinet of Sunnyvale, Calif.

The access points 120 connect with stations 130A-C during an emergency to display evacuation routing and other information. In one embodiment, a mobile app interrupts operation and displays the AI-calculated route. Each access point can have a unique evacuation route based on density mapping, construction materials, and other hazards in the area. To assist in AI training, a manual count of individuals at any particular time can be input to accompany other factor being collected, such as number of connected stations and throughput. Further, camera can be used to count persons over a window of time and identify a number of individuals recognized from video through computer recognition techniques. In one case, foreign access point 120C and connected stations 130C is not part of the enterprise system but can be heard by the system.

The access points 120A,B physically include one or more individual access points implemented in any of the computing devices discussed herein (e.g., see FIG. 6). For example, the access points 120A,B can be an AP 110 or AP 433 (modified as discussed herein) by Fortinet of Sunnyvale, Calif. A network administrator can strategically place the access points 120A,B for optimal coverage area over a locale. Further embodiments of the access points 120A,B are discussed with respect to FIG. 2B.

The stations 130A-C display emergency evacuation information to users. A mobile app can be downloaded for direct communication. Alternatively, other emergency functions of the stations 130A-C built into the OS can be activated (e.g., spawn a browser window). Visual alerts, such as LED lights, and audio alerts, such as horns or text signals can also be used to draw attention to users.

Additionally, the stations 130A-C of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

Figure 2A:
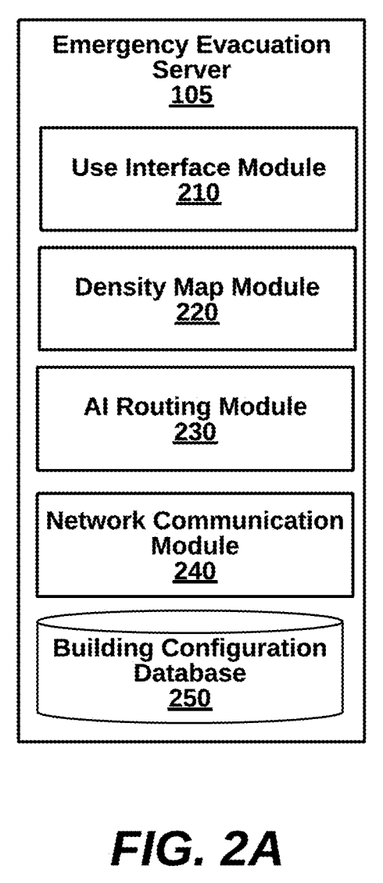
FIG. 2A is a more detailed block diagram illustrating internal components of an emergency evacuation server from the system of FIG. 1, according to one embodiment.

FIG. 2A is a more detailed block diagram illustrating the emergency evacuation server 105 of the system 100, according to one embodiment. The emergency evacuation server 110 comprises user interface module 210, density map module 220, AI routing module 230, network communication module 240, and building configuration database 260.

User interface module 210 can be, for example, a graphical user interface, a command line interface, or any other mechanism for providing user input and output to the emergency evacuation server 105. An admin can configure building mapping by walking around a building with a GPS-enabled smartphone and notating in an interface locations of access points, doors, stairways, windows, water hoses, construction materials, and other information for input. The density map module 220 combines known mapping information with known real-time network information to generate a density map. The AI routing module 230 is trained with data form the network and local data collected in order to continually update routing capabilities. Real-time routing is activated in emergency situations. The network communication module 240 provides a secure communication channel with the controller 110 and other network devices. The building configuration database 250 stores building layouts along with other building information used for calculating routes.

Figure 2B:
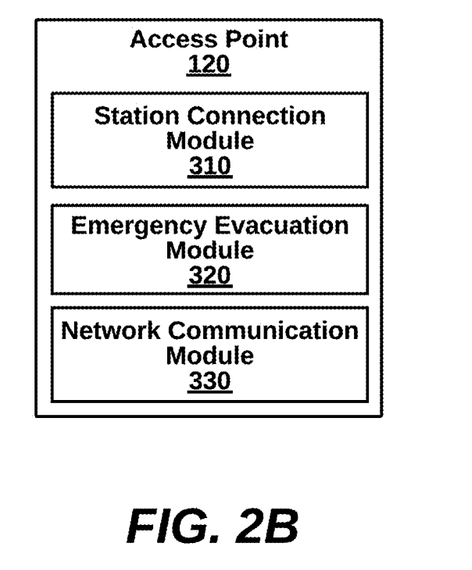
FIG. 2B is a more detailed block diagram illustrating internal components of an access point from the system of FIG. 1, according to one embodiment.

FIG. 2B is a more detailed block diagram illustrating the access point 105 of the system 100, according to one embodiment. A station connection module 310 tracks stations within range, connected and unconnected, and sends lists back to the controller 105. The emergency evacuation module 320 connects to stations for emergency evacuation routing. The network communication module 330 provides Wi-Fi connections to the stations and Ethernet connections to the controller 105 and other network devices.

Figure 4:
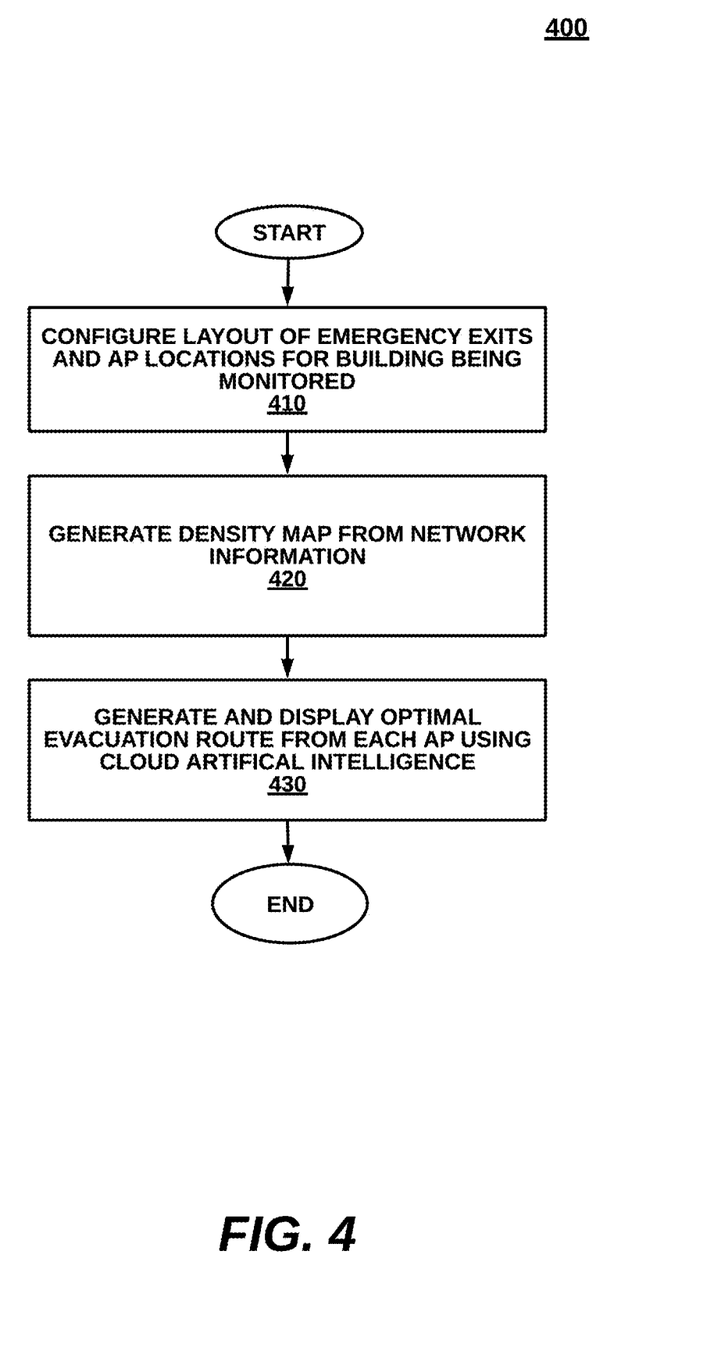
FIG. 4 is a high-level flow diagram illustrating a method for cloud-based intelligence to emergency evacuation systems using Wi-Fi access points over data communication systems, according to one embodiment.
Figure 5:
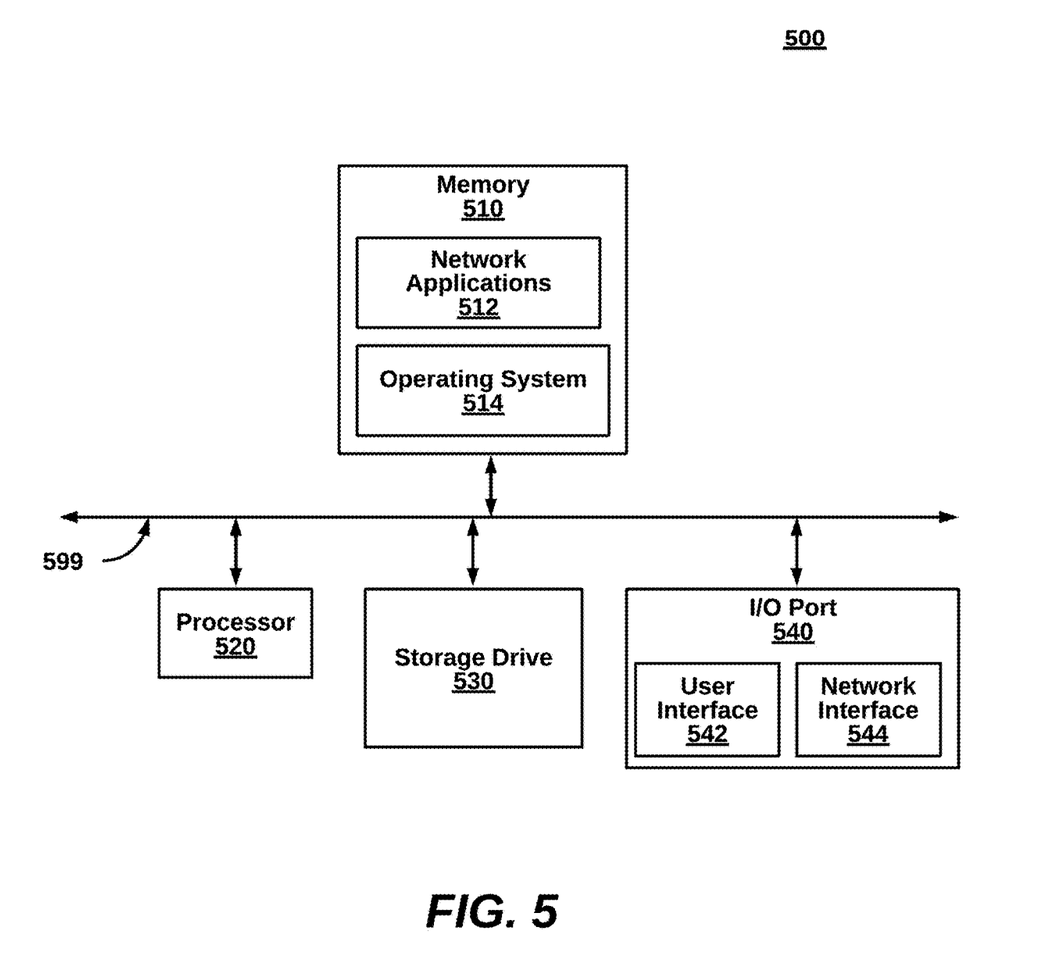
FIG. 5 is a block diagram illustrating an example computing device, according to one embodiment.

Methods for Cloud AI Emergency Evacuation (FIGS. 4-5)

FIG. 4 is a high-level flow diagram illustrating a method 400 for cloud-based intelligence to emergency evacuation systems using Wi-Fi access points over data communication systems, according to one embodiment. The method 400 can be implemented by the system 100 of FIG. 1 or a different system. One of ordinary skill in the art will recognize that the method 400 is non-limiting as other embodiments can have more or less steps and can be performed in a different order.

At step 410, a layout of emergency exits and AP locations for a building being monitored is configured. At step 420, a density mapping is generated from network information. At step 430, optimal evacuation routs are displayed on a per-AP bases to stations within radio range, using cloud-based artificial AI.

Generic Computing Device (FIG. 5)

FIG. 5 is a block diagram illustrating an exemplary computing device 500 for use in the system 100 of FIG. 1, according to one embodiment. The computing device 500 is an exemplary device that is implementable for each of the components of the system 100, including the emergency evacuation server 105, the controller 110, the access points 120A-B, and the stations 130A-C. The computing device 500 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 500, of the present embodiment, includes a memory 510, a processor 520, a storage drive 530, and an I/O port 540. Each of the components is coupled for electronic communication via a bus 599. Communication can be digital and/or analog, and use any suitable protocol.

The memory 510 further comprises network applications 512 and an operating system 514. The network applications 512 can include the modules of the central locationing server 110, the access points 120A,B, and the stations 130A-C, as illustrated in FIGS. 1-3. Other network applications 512 can include a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x54 Edition, Windows Vista, Windows CE, Windows Mobile, Windows 5 or Windows 8), Linux, HP-UX, UNIX, Sun OS, Solaris, Mac OS X, Alpha OS, AIX, IRIX32, or IRIX54. Other operating systems may be used. Microsoft Windows is a trademark of Microsoft Corporation.

The processor 520 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 530.

The storage drive 530 can be any non-volatile type of storage such as a magnetic disc, EEPROM (electronically erasable programmable read-only memory), Flash, or the like. The storage drive 530 stores code and data for applications.

The I/O port 540 further comprises a user interface 542 and a network interface 544. The user interface 542 can output to a display device and receive input from, for example, a keyboard. The network interface 544 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a Wi-Fi controller device, implemented at least partially in hardware and communicatively coupled to a plurality of access points on a data communication network which are in turn coupled to a plurality of wireless stations on a Wi-Fi portion of the data communication network, the method for emergency evacuation routing through access points on a data communication network, the method comprising the steps of:

configuring a layout of emergency exits for a building being monitored and access point locations within the building layout;

tracking wireless stations that are active and connected to access point locations and tracking wireless stations that are active and are not connected to access point locations, wherein the connected wireless stations are part of the enterprise network and wherein the non-connected wireless stations are not part of the enterprise system but are heard within RF range;

training artificial intelligence to estimate a number of people near each access point based on a number of connected wireless stations and a number of non-connected wireless stations, associated with each access point;

detecting an emergency that requires evacuation of people from the building from an emergency system associated with the building;

estimating a current density using artificial intelligence;
generating an optimal evacuation route from each access point based on the current density and the building layout; and
displaying the optimal evacuation route for each access point on the connected wireless stations within range of each access point.

2. The method of claim 1, wherein the step of training artificial intelligence to estimate a number of people near each access point based on a number of wireless connected stations and a number of non-connected wireless stations, associated with each access point, comprises estimating a number people near each access point based on data throughput.

3. A non-transitory computer-readable medium to, when executed by a processor, perform a computer-implemented method in a central locationing server implemented at least partially in hardware and communicatively coupled to a plurality of access points on a data communication network which are in turn coupled to a plurality of wireless stations on a Wi-Fi portion of the data communication network for emergency evacuating routing through access points on a data communication network, the method comprising the steps of:

configuring a layout of emergency exits for a building being monitored and access point locations within the building layout;
tracking wireless stations that are active and connected to access point locations and tracking wireless stations that are active and are not connected to access point locations, wherein the connected wireless stations are part of the enterprise network and wherein the non-connected wireless stations are not part of the enterprise system but are heard within RF range;
training artificial intelligence to estimate a number of people near each access point based on a number of connected wireless stations and a number of non-connected wireless stations, associated with each access point;
detecting an emergency that requires evacuation of people from the building from an emergency system associated with the building;
estimating a current density using artificial intelligence;
generating an optimal evacuation route from each access point based on the current density and the building layout; and
displaying the optimal evacuation route for each access point on the connected wireless stations within range of each access point.

4. A Wi-Fi controller device implemented at least partially in hardware and communicatively coupled to a plurality of access points on a data communication network which are in turn coupled to a plurality of wireless stations on a Wi-Fi portion of the data communication network, for emergency evacuation routing through access points on a data communication network, the Wi-Fi controller comprising:

a processor;
a network interface, communicatively coupled to the processor; and
a memory, communicatively coupled to the processor and storing:
a layout module to configure a layout of emergency exits for a building being monitored and access point locations within the building layout using a building configuration database;
a tracking module to track wireless stations that are active and connected to access point locations and tracking wireless stations that are active and are not connected to access point locations, wherein the connected wireless stations are part of the enterprise network and wherein the non- connected wireless stations are not part of the enterprise system but are heard within RF range;
a density map module to train artificial intelligence to estimate a number of people near each access point based on a number of connected wireless stations and a number of non-connected wireless stations, associated with each access point;
an AI routing module to detect an emergency that requires evacuation of people from the building from an emergency system associated with the building, estimate a current density using artificial intelligence, generate an optimal evacuation route from each access point based on the current density and the building layout, display the optimal evacuation route for each access point on the connected wireless stations within range of each access point.

* * * * *